US012638928B2

(12) United States Patent
Singh et al.

(10) Patent No.: US 12,638,928 B2
(45) Date of Patent: May 26, 2026

(54) MACHINE LEARNING AND BEHAVIOR BASED AUGMENTED KEY GENERATION

(71) Applicant: Citrix Systems, Inc., Fort Lauderdale, FL (US)

(72) Inventors: Manbinder Pal Singh, Coral Springs, FL (US); Pralay Kumar Das, Bangalore (IN); Shakti Kumar Singh, Bangalore (IN); Sreekanth Challa, Bangalore (IN)

( * ) Notice: Subject to any disclaimer, the term of this patent is extended or adjusted under 35 U.S.C. 154(b) by 425 days.

(21) Appl. No.: 17/663,968

(22) Filed: May 18, 2022

(65) Prior Publication Data

US 2023/0305641 A1 Sep. 28, 2023

(30) Foreign Application Priority Data

Mar. 28, 2022 (IN) .............................. 202241017835

(51) Int. Cl.
| | |
|---|---|
| *G06F 3/023* | (2006.01) |
| *G06F 3/04886* | (2022.01) |
| *G06T 11/00* | (2006.01) |
| *G06V 20/20* | (2022.01) |

(Continued)

(52) U.S. Cl.
CPC .......... *G06F 3/0236* (2013.01); *G06F 3/0237* (2013.01); *G06F 3/04886* (2013.01); *G06T 11/00* (2013.01); *G06V 20/20* (2022.01); *G06V 30/1456* (2022.01); *G06F 3/04895* (2013.01)

(58) Field of Classification Search
CPC .. G06F 3/0236; G06F 3/0237; G06F 3/04886;

G06F 3/04895; G06F 3/011; G06F 3/0481; G06F 3/04842; G06F 3/0488; G06T 11/00; G06V 20/20; G06V 30/1456
See application file for complete search history.

(56) References Cited

U.S. PATENT DOCUMENTS

| | | | | |
|---|---|---|---|---|
| 2009/0322671 | A1* | 12/2009 | Scott | G06F 3/013 |
| | | | | 345/173 |
| 2012/0249741 | A1* | 10/2012 | Maciocci | G06T 19/006 |
| | | | | 348/51 |

(Continued)

OTHER PUBLICATIONS

Wall Street Journal : "NEC Turns a Person's Arm Into a Keyboard": Nov. 6, 2015 , https://www.youtube.com/watch?v=MVDWG33YTsg.

(Continued)

*Primary Examiner* — William A Beutel

(57) ABSTRACT

Methods and systems for augmented key generation are described herein. A computing system may receive, from a first user device, an image of a keyboard of a second user device. The computing platform may detect, based on the image, a first missing key of the keyboard, and may generate an augmented version of the first missing key. The computing platform may send, to the first user device, the augmented version of the first missing key and commands directing the first user device to display the augmented version of the first missing key, which may cause the first user device to display the augmented version of the first missing key. Selection of the augmented version of the first missing key on the first user device may cause display of a character, corresponding to the first missing key, to be displayed at the second user device.

18 Claims, 11 Drawing Sheets

(51) Int. Cl.
    *G06V 30/14*        (2022.01)
    *G06F 3/04895*    (2022.01)

(56)              References Cited

U.S. PATENT DOCUMENTS

| 2014/0035819 | A1* | 2/2014 | Griffin | ................. | G06F 3/0238 |
| | | | | | 345/168 |
| 2018/0350150 | A1* | 12/2018 | Powderly | .............. | G06T 19/006 |
| 2020/0225735 | A1* | 7/2020 | Schwarz | .............. | G06F 3/0233 |

OTHER PUBLICATIONS

TheHopelessGeek: "Samsung's Virtual AL Keyboard tech! Samsung Selfie Type" Apr. 15, 2020 https://www.youtube.com/watch?v=WqbTxSIsARk.

* cited by examiner

203 PROCESSOR

205 RAM

207 ROM

209 INPUT/ OUTPUT MODULE

217 MEMORY

OPERATING SYSTEM

219 APPLICATIONS

DATA

215

221

201 (206A)

206

206n

223 LAN INTERFACE(S)

WAN INTERFACE(S) 227

200

LAN 225

WAN 229

230 COMPUTER NETWORK

240

240

240

240

MACHINE LEARNING AND BEHAVIOR BASED AUGMENTED KEY GENERATION

CROSS-REFERENCE TO RELATED APPLICATION

This application claims priority to Indian Provisional Application No. 202241017835 filed on Mar. 28, 2022, the entire disclosure of which is hereby incorporated herein reference.

FIELD

Aspects described herein generally relate to computer networking, electronic messaging systems, and hardware and software related thereto. More specifically, one or more aspects described herein provide techniques to automatically identify broken, missing, or otherwise defective keys, and to generate augmented versions of such keys accordingly.

BACKGROUND

In some instances, keyboard keys may break or otherwise be defective. Until such keys may be repaired, cumbersome workarounds may be used to provide functionality of the broken/defective keys (e.g., use of an on screen keyboard (OS K), an external keyboard, autocorrection, or the like). Such workarounds may be inefficient and/or negatively affect a user experience.

Additionally or alternatively, a user may have a preferred keyboard layout, but may be accessing a keyboard with a different layout (e.g., due to flexible work seating, varying languages and/or alphabets, travel, and/or other reasons). Use of this different keyboard may further lead to reduced efficiency and/or negative experience. Accordingly, in either instance, it may be important to address such keyboard deficiencies to improve productivity, efficiency, and/or experience associated with the use of such keys/keyboards.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

In one or more embodiments described herein, a computing system may receive, from a first user device, an image of a keyboard of a second user device. The computing system may detect, based on the image, a first missing key of the keyboard of the second user device. The computing system may determine an identity of the first missing key. The computing system may generate an augmented version of the first missing key. The computing system may send, to the first user device, the augmented version of the first missing key and one or more commands directing the first user device to display the augmented version of the first missing key, where: 1) sending the one or more commands directing the first user device to display the augmented version of the first missing key may cause the first user device to display the augmented version of the first missing key, and 2) selection of the augmented version of the first missing key on the first user device may cause display of a character, corresponding to the first missing key, to be displayed at the second user device.

In one or more instances, the first user device may be one of: a mobile device, a tablet, or augmented reality glasses, and the second user device may be one of: a desktop computer or a laptop computer. In one or more instances, the computing system may determine the identity of the first missing key by identifying, using machine learning computer vision image processing, the first missing key.

In one or more instances, the computing system may identify, based on a position of the first missing key on the keyboard of the second user device, a placement recommendation for the first user device, which may indicate: 1) a side of the keyboard of the second user device on which to place the first user device, and 2) a position, on the indicated side, with respect to the keyboard of the second user device at which to place the first user device. The computing system may send, to the first user device and along with the augmented version of the first missing key, the placement recommendation.

In one or more instances, the computing system may identify a location of the first user device with respect to the keyboard of the second user device, where sending the one or more commands directing the first user device to display the augmented version of the first missing key may cause the first user device to display the augmented version of the first missing key at a position of the first user device that is most proximate to a location of the first missing key on the keyboard of the second user device. In one or more instances, the computing system may detect a change in the location of the first user device with respect to the keyboard of the second user device. The computing system may send, based on detecting the change in the location of the first user device, one or more commands directing the first user device to display the augmented version of the first missing key at a different position on the first user device, where the different position may be more proximate to the location of the first missing key on the keyboard of the second user device than the position after the change in the location of the first user device.

In one or more instances, simultaneous selection of the first missing key and a second key on the keyboard of the second user device may have an expected function, and simultaneous selection of the augmented version of the first missing key and the second key on the keyboard of the second user device may execute the expected function. In one or more instances, the computing system may monitor the second user device. The computing system may detect, while monitoring the second user device, that a second key of the keyboard of the second user device: 1) is physically present on the keyboard of the second user device, and 2) selection of the second key fails to cause a second character, corresponding to the second key, to be displayed at the second user device.

In one or more instances, detecting that the second key fails to cause the second character to be displayed at the second user device may include detecting one or more of: 1) selection of the second character on an on screen keyboard (OSK) at the second user device; or 2) use of autocorrection at the second user device to insert the second character into a plurality of words.

In one or more instances, the computing system may receive user preference information, which may indicate a preferred keyboard for a user of the second user device. The computing system may identify, by comparing the preferred keyboard to the keyboard of the second user device, that the keyboard of the second user device is different that the preferred keyboard.

In one or more instances, the computing system may identify keys, included in the preferred keyboard, that are not included in the keyboard of the second user device. The computing system may generate an augmented version of the identified keys. The computing system may send, to the first user device, the augmented version of the identified keys and one or more commands directing the first user device to display the augmented version of the identified keys, where: 1) sending the one or more commands directing the first user device to display the augmented version of the identified keys may cause the first user device to display the augmented version of the identified keys, and 2) selection of the augmented version of one or more of the identified keys may cause display of a character, of the corresponding identified key, to be displayed at the second user device.

In one or more instances, the preferred keyboard may include a second key configured to perform a particular function, and the keyboard of the second user device might not include a key configured to perform the particular function. In one or more instances, the computing system may generate an augmented version of the second key. The computing system may send, to the first user device, the augmented version of the second key and one or more commands directing the first user device to display the augmented version of the second key, where: 1) sending the one or more commands directing the first user device to display the augmented version of the second key may cause the first user device to display the augmented version of the second key, and 2) selection of the augmented version of second key may cause execution of the particular function at the second user device.

In one or more instances, the preferred keyboard may correspond to a first language, the keyboard of the second user device may correspond to a second language, and a layout of the preferred keyboard may be different than a layout of the keyboard of the second user device. In one or more instances, the computing system may generate an augmented version of the preferred keyboard, where the augmented version of the preferred keyboard may be: 1) configured for display as an overlay on top of the keyboard of the second user device, and 2) based on the layout of the keyboard of the second user device. The computing system may identify one or more keys, included in the preferred keyboard and not included in the keyboard of the second user device. The computing system may generate an augmented version of the identified one or more keys. The computing system may send, to a third user device, the augmented version of the preferred keyboard and one or more commands directing the third user device to display the augmented version of the preferred keyboard as an augmented reality overlay on the keyboard of the second user device, where the third user device may be an augmented reality device. The computing system may send, to the first user device, the augmented version of the identified one or more keys, and one or more commands directing the first user device to display the augmented version of the identified keys.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
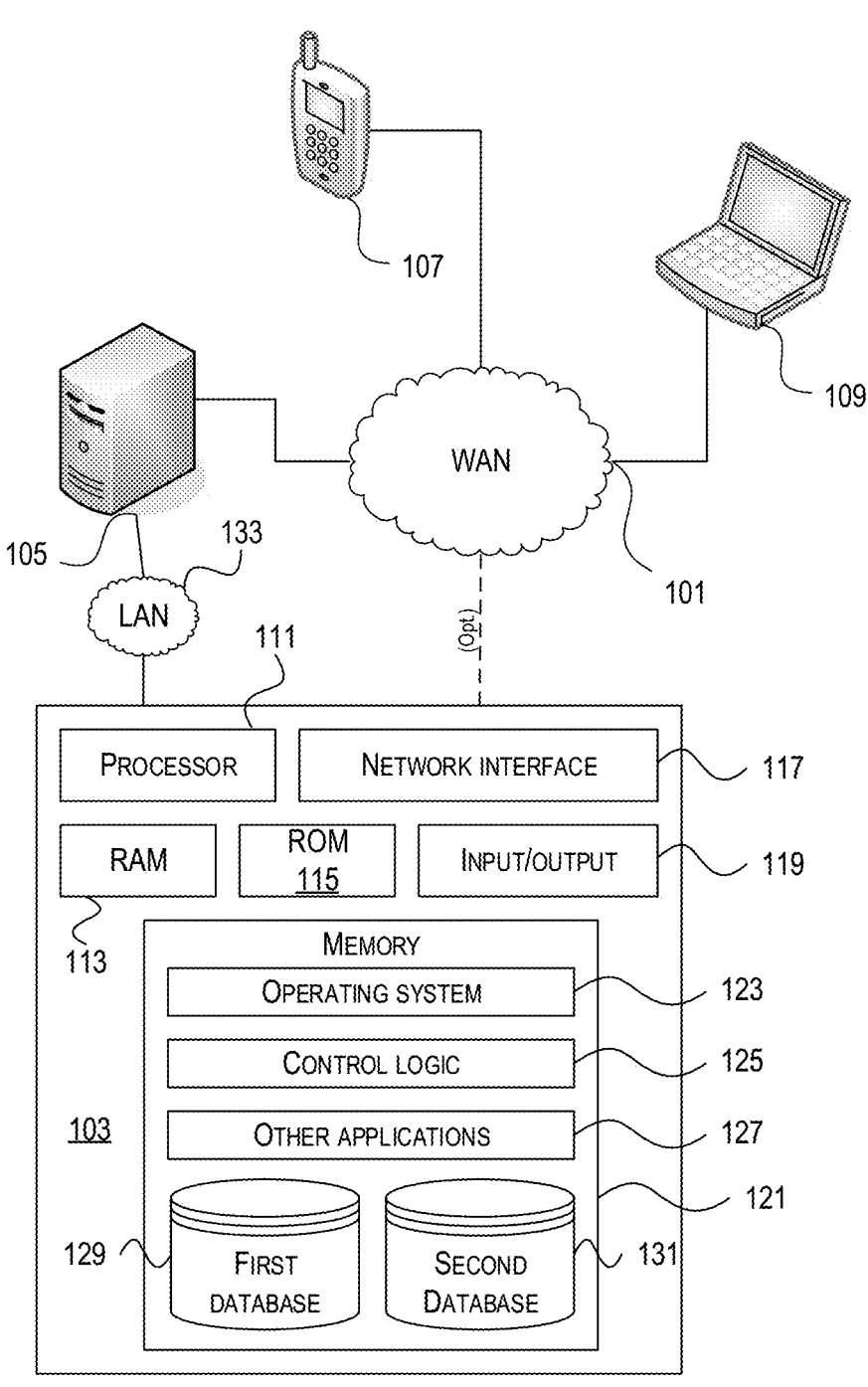
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using machine learning computer vision image processing to analyze keyboard images via a user's touch device (e.g., mobile phone, and/or other device), identify the missing key(s), and recommend that the missing keys be presented as augmented key(s) on the user device so that the user may simply tap on the user device to execute the functionality of the missing key.

For example, a missing "E" key may be identified on a user's laptop or other workstation device using machine learning computer vision/image processing, and may be provided as an augmented key on the user's mobile device (e.g., via a workspace application). In this example, the user may place the phone alongside the keyboard, and may press the augmented "E" key on the mobile device while using the remaining keys of the keyboard.

In some instances, a key may be visible, but pressing the key might not work (e.g., a broken, but not missing, key). In these cases, computer vision might not detect a broken key. Rather, a user may launch a tool such as an on screen keyboard (OSK), and then use the mouse to click on the broken key in the software too/software keyboard. This may be challenging for the user, as they may have to switch to a mix mode of using both a hardware and software keyboard.

In these instances, this mixed/hybrid mode of keys may be detected, and used to identify the broken key being accessed using the software tool. Then, an augmented version of the broken key may be generated and available via the workspace application on the user's touch device.

In some instances, typing behavior may be learned by the system, such as the main keyboard functionalities a user may use to perform certain operations. For example, a user may use the number pad on a keyboard, a print key to do print operations, page up and down keys, and/or other functions. This method may then identify that the keyboard being used by the user is missing one or more of those main keyboard functionalities, and may recommend augmented keys for the user that may provide those functionalities on the user's mobile/touch device.

In some instances, the user may select or configure one or more keys to be presented as augmented keys on the user's touch device. In some instances, the user may use both the hardware keyboard on a first device and augmented keys on a second device simultaneously (e.g., pressing shift on the hardware keyboard of the first device and the augmented "e" key on the second device may type the capital "E").

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
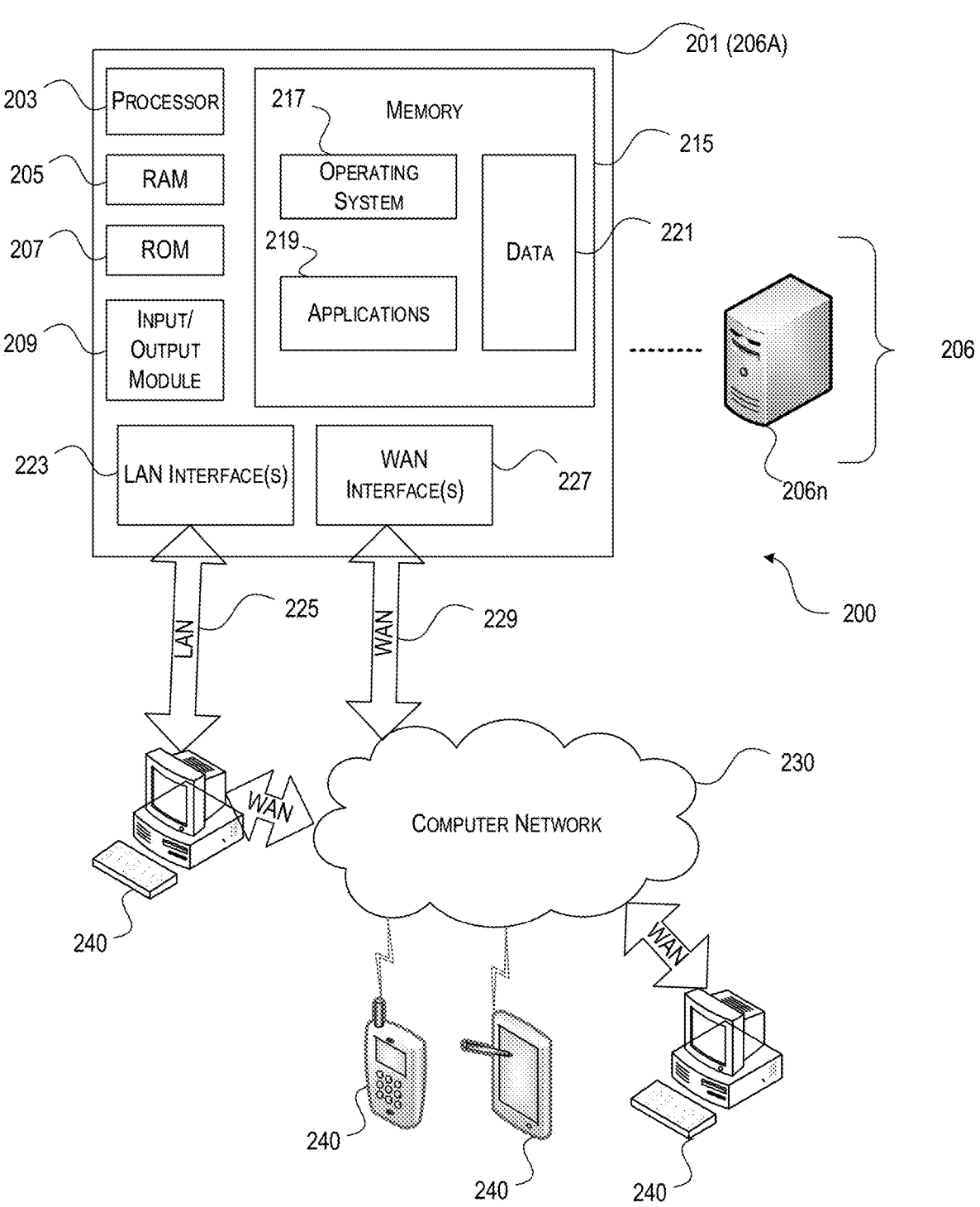
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Machine Learning and Behavior Based Augmented Key Generation

Figure 3A:
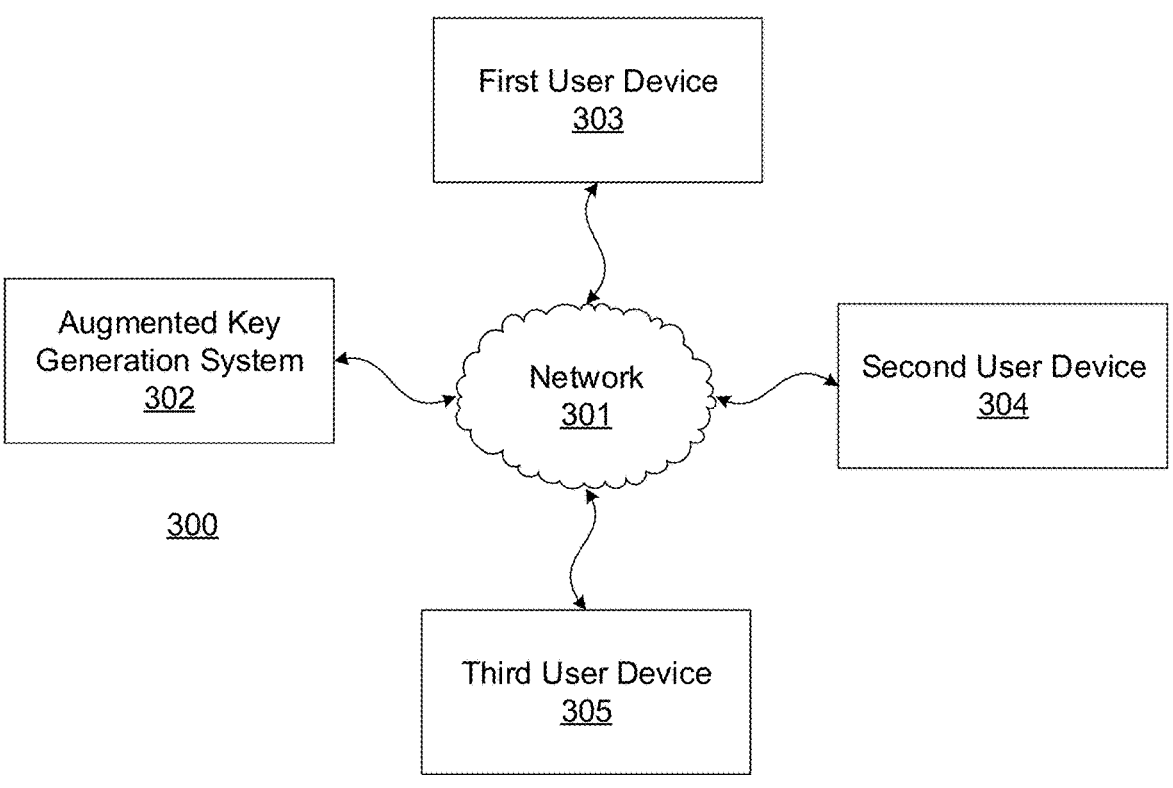
FIGS. 3A-3B depict an illustrative computing architecture that may be used for image and/or behavior based augmented key generation in accordance with one or more illustrative aspects described herein.
Figure 3B:
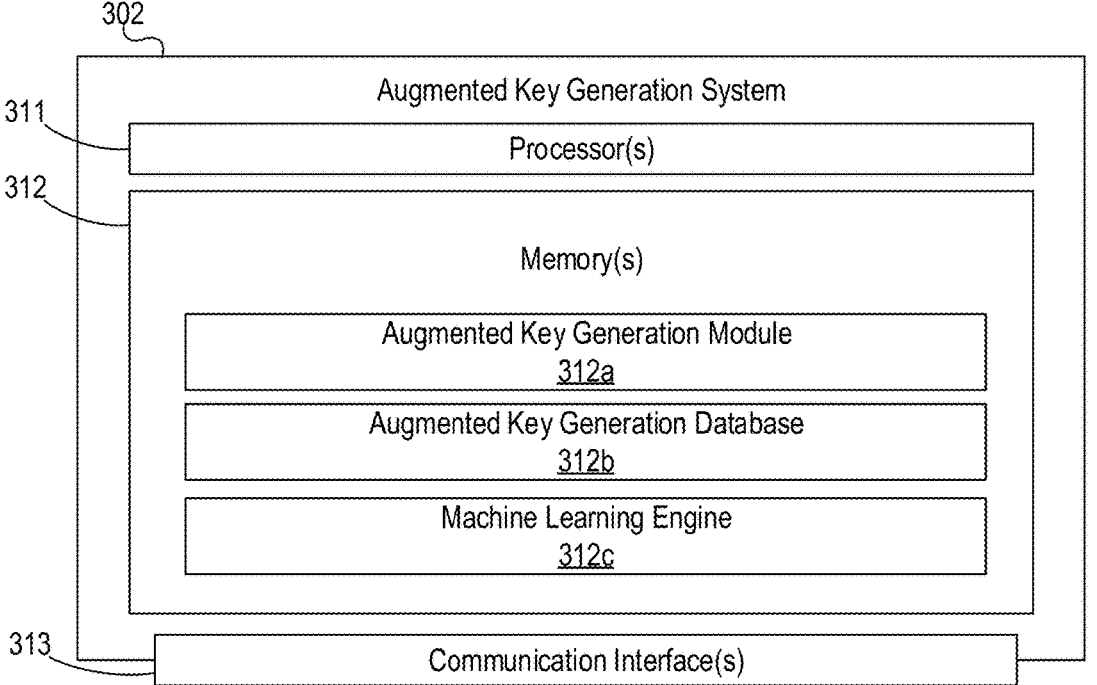

FIGS. 3A and 3B depict an illustrative computing environment for performing image and/or behavior based augmented key generation in accordance with one or more example embodiments. Referring to FIG. 3A, computing environment 300 may include one or more computer systems. For example, computing environment 300 may include augmented key generation system 302, first user device 303, second user device 304, and third user device 305.

As illustrated further below, augmented key generation system 302 (which may be similar to web server 105 or data server 103, shown in FIG. 1, and/or computing device 201 or server 206, shown in FIG. 2), may maintain and/or otherwise host one or more machine learning and/or computer vision models. For example, the augmented key generation system 302 may use these models to identify broken keys, missing keys, and/or alternative keyboard/keys. The augmented key generation system 302 may further be configured to output augmented keys and/or keyboards based on the model analysis. In some instances, the augmented key generation system 302 may be configured to communicate with one or more user devices (e.g., first user device 303, second user device 304, and/or third user device 305) to provide the augmented keys.

First user device 303 (which may, e.g., be a computing device similar to devices 107 or 109, shown in FIG. 1, or client machine 240, shown in FIG. 2) may include one or more computing devices configured to perform one or more of the functions described herein. For example, first user device 303 may be a desktop computer, laptop computer, and/or other device including a physical keyboard. In some instances, the first user device 303 may be configured to display one or more graphical user interfaces.

Second user device 304 (which may, e.g., be a computing device similar to devices 107 or 109, shown in FIG. 1, or client machine 240, shown in FIG. 2) may include one or more computing devices configured to perform one or more of the functions described herein. For example, second user device 304 may be a mobile device, a tablet, a smart phone, augmented reality glasses, or the like. In some instances, the second user device 304 may be configured to capture images (e.g., of a keyboard of the first user device 303) and/or to display one or more augmented keys (e.g., keys, keyboards, or the like). In some instances, the second user device 304 may be configured to display one or more graphical user interfaces (e.g., augmented key interfaces, augmented keyboard interfaces, and/or other interfaces).

Third user device 305 (which may, e.g., be a computing device similar to devices 107 or 109, shown in FIG. 1, or client machine 240, shown in FIG. 2) may include one or more computing devices configured to perform one or more of the functions described herein. For example, third user device 305 may be a mobile device, a tablet, a smart phone, augmented reality glasses, or the like. In some instances, the third user device 305 may be configured to capture images (e.g., of a keyboard of the first user device 303) and/or to display one or more augmented keys (e.g., keys, keyboards, or the like). In some instances, the third user device 305 may be configured to display one or more graphical user interfaces (e.g., augmented key interfaces, augmented keyboard interfaces, and/or other interfaces).

Computing environment 300 may also include one or more networks, which may interconnect augmented key generation system 302, first user device 303, second user device 304, and third user device 305. For example, computing environment 300 may include a network 301 (which may e.g., interconnect augmented key generation system 302, first user device 303, second user device 304, and/or third user device 305). In some instances, the network 301 may be similar to computer network 230, which is shown in FIG. 2.

In one or more arrangements, augmented key generation system 302, first user device 303, second user device 304, third user device 305, and/or the other systems included in computing environment 300 may be any type of computing device capable of receiving a user interface, receiving input via the user interface, and communicating the received input to one or more other computing devices. For example, augmented key generation system 302, first user device 303, second user device 304, third user device 305, and/or the other systems included in computing environment 300 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of augmented key generation system 302, first user device 303, second user device 304, and/or third user device 305 may, in some instances, be special purpose computing devices configured to perform specific functions.

Figure 4A:
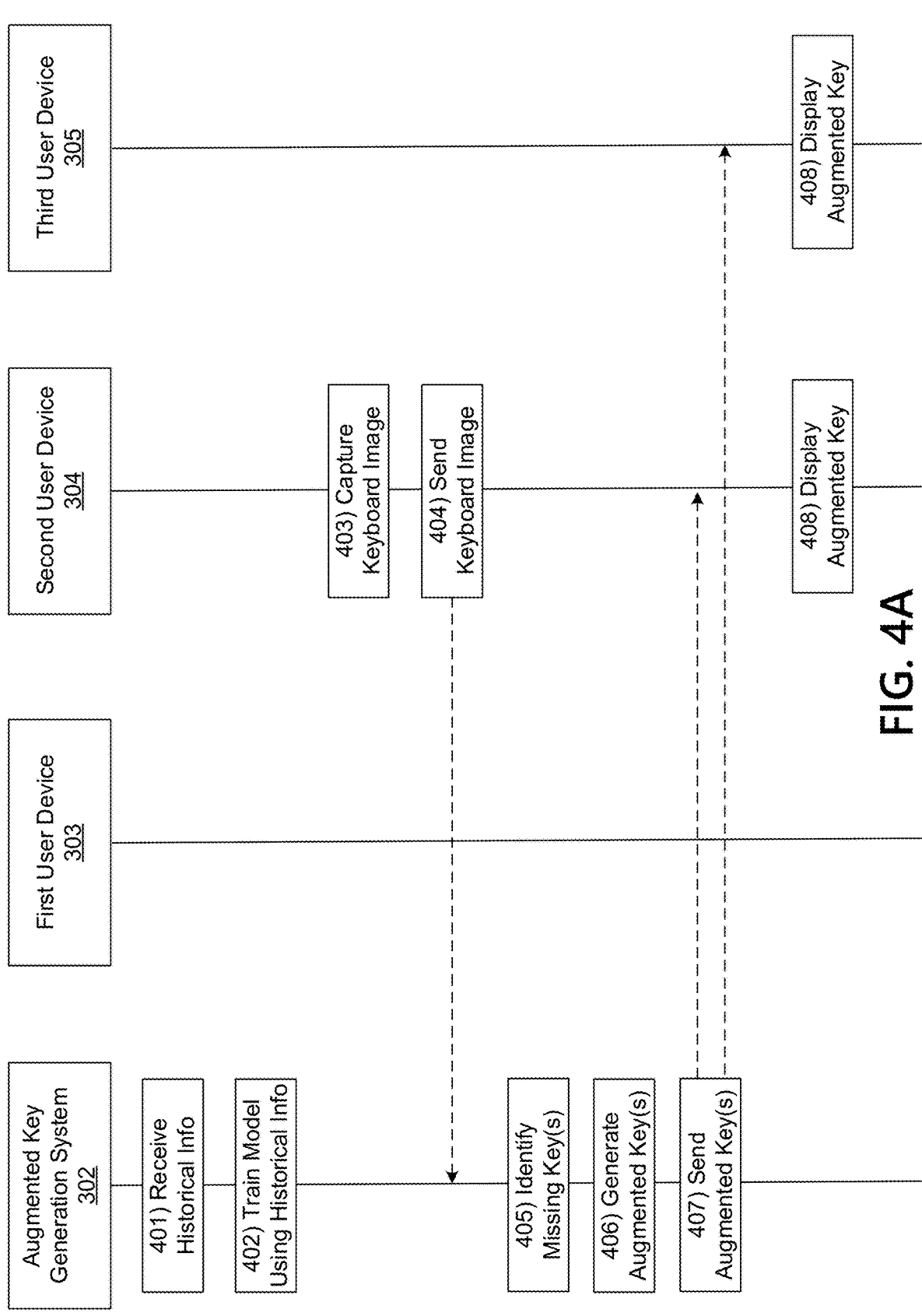
FIGS. 4A-4C depict an illustrative event sequence that may be used for image and/or behavior based augmented key generation in accordance with one or more illustrative aspects described herein.
Figure 4B:
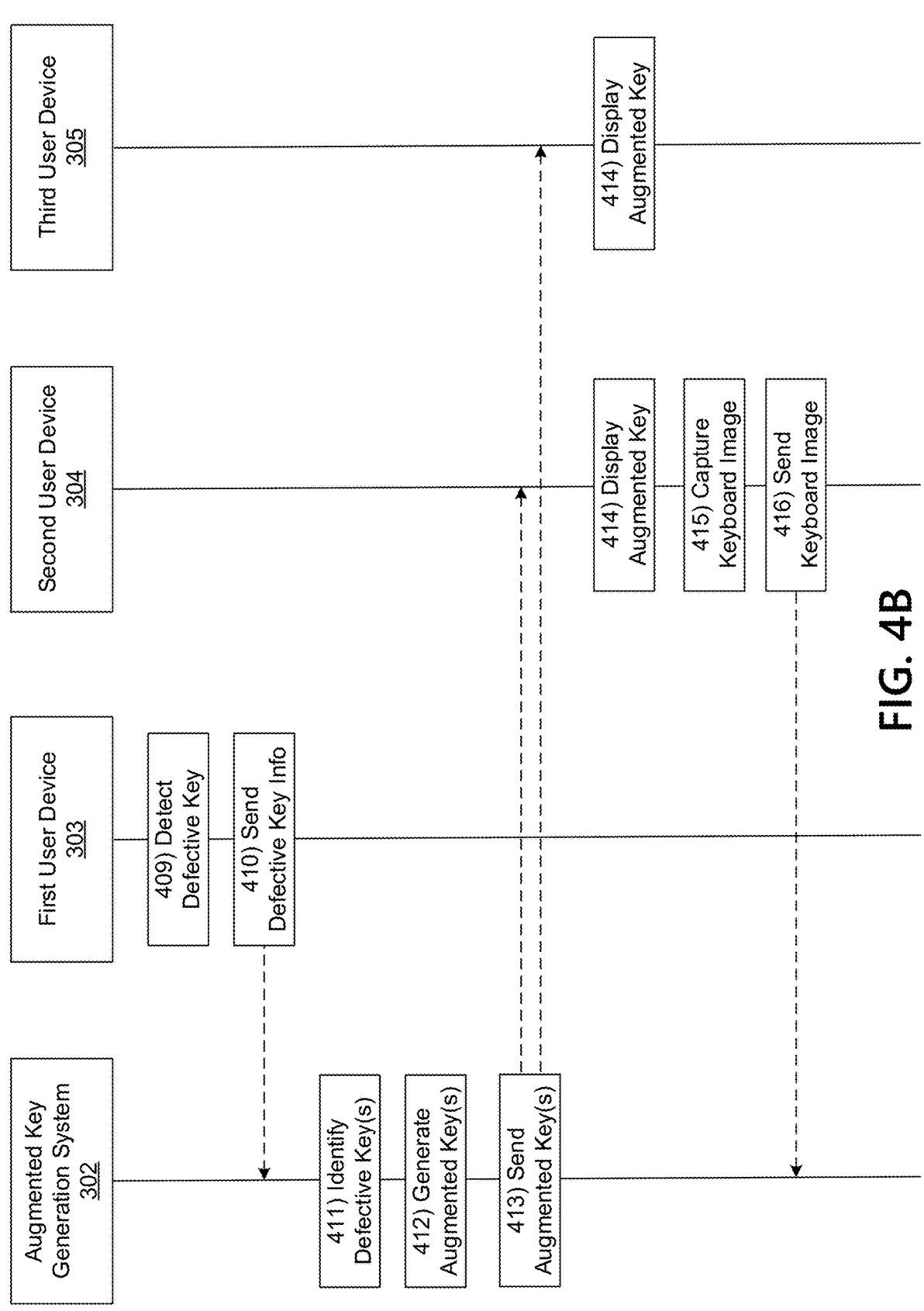
Figure 4C:
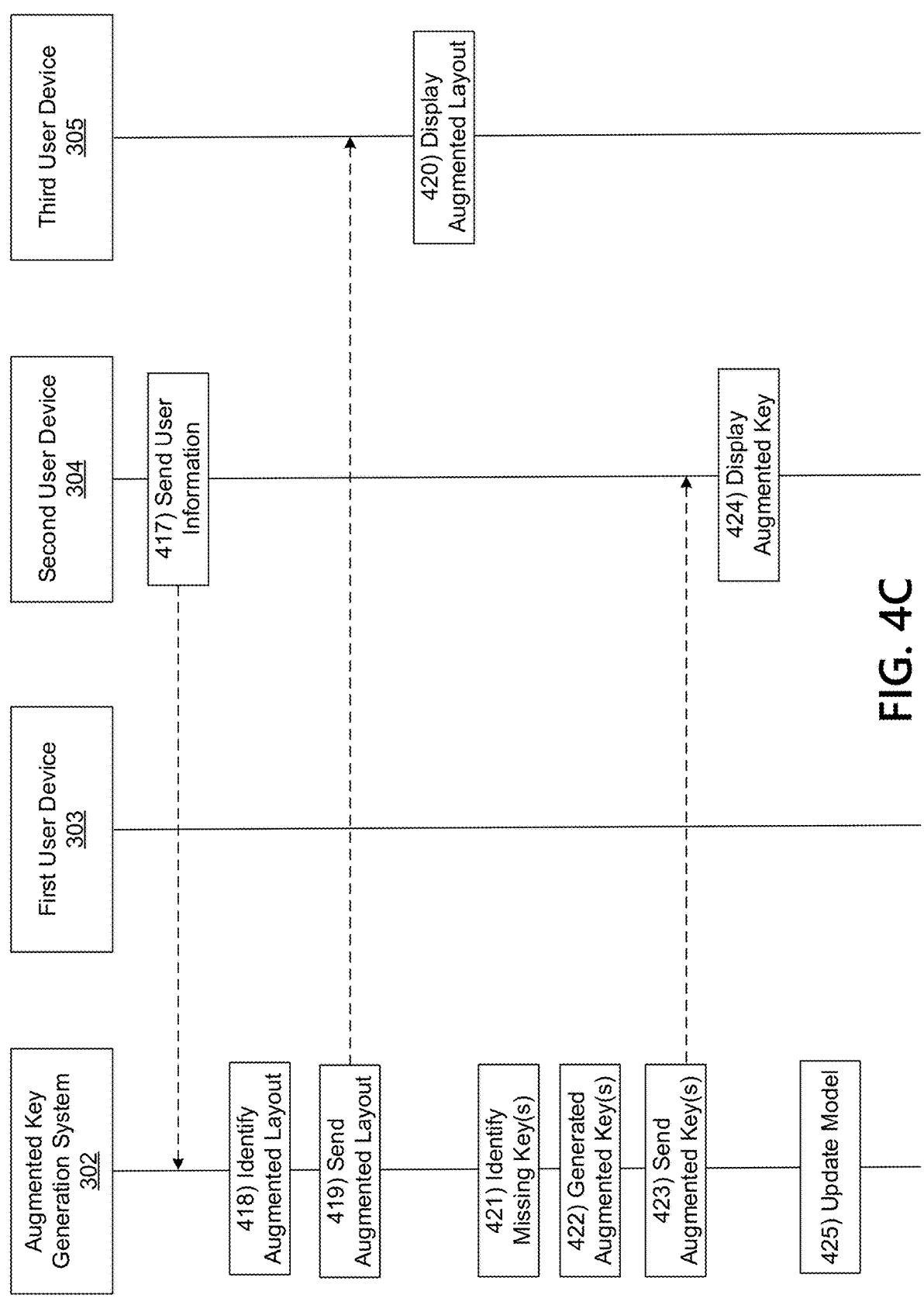

Referring to FIG. 3B, augmented key generation system 302 may include one or more processors 311, memory 312, and communication interface 313. A data bus may interconnect processor 311, memory 312, and communication interface 313. Communication interface 313 may be a network interface configured to support communication between the augmented key generation system 302 and one or more networks (e.g., network 301, or the like). Memory 312 may include one or more program modules having instructions that when executed by processor 311 cause augmented key generation system 302 to perform one or more functions described herein and/or access one or more databases that may store and/or otherwise maintain information which may be used by such program modules and/or processor 311. In some instances, the one or more program modules and/or databases may be stored by and/or maintained in different memory units of augmented key generation system 302. For example, augmented key generation system 302 may have, host, store, and/or include an augmented key generation module 312a. Augmented key generation module 312a may enable or otherwise perform augmented key/keyboard generation, as described in greater detail below. Augmented key generation database 312b may store or otherwise host information that may support the analysis performed by the augmented key generation module 312a and/or the augmented key generation system 302. Machine learning engine 312c may include one or more datasets, models, rules, and/or other information that may be used to determine whether or not augmented keys/keyboards should be generated, and may be used to iteratively refine this process to improve accuracy FIGS. 4A-4C depict an illustrative event sequence for performing image and/or behavior based augmented key generation in accordance with one or more example embodiments. It should be understood that steps 401-424 may, in some instances, occur in the order as shown with regard to FIGS. 4A-4C. For example, after completing step 408 of FIG. 4A, the event sequence may proceed to step 409 of FIG. 4B.

Referring to FIG. 4A, at step 401, the augmented key generation system 302 may receive historical information. For example, the augmented key generation system 302 may receive historical image information, which may, in some instances, include keyboard images, labelled with their corresponding key value (e.g., letter, number, character, function, and/or otherwise). Additionally or alternatively, the augmented key generation system 302 may receive historical user typing information, which may, e.g., include keyboard layouts used by various users (and the frequency with which the various users use these keyboard layouts), specific function keys user by the various users, keyboard preference information, and/or other information).

At step 402, the augmented key generation system 302 may train an augmented key generation model (e.g., using the historical information received at step 401). For example, the augmented key generation system 302 may feed the historical information into the augmented key generation model to train the augmented key generation model to identify missing keys (e.g., using computer vision/ machine learning methods) by comparing captured images to the historical image information. Additionally or alternatively, the augmented key generation system 302 may feed the historical information into the augmented key generation model to train the augmented key generation model to identify whether a current keyboard/keyboard layout corresponds to a preferred keyboard/layout for a given user (e.g., using one or more machine learning techniques to compare the functions/layout of a present keyboard to the functions/ layout of a preferred keyboard for the user).

In some instances, in training the augmented key generation model, the augmented key generation system 302 may train a convolutional neural network. In some instances, in training (and subsequently validating and testing) the augmented key generation model, the augmented key generation system 302 may use a k fold strategy. In these instances, the augmented key generation model may be trained to output a missing key based on an input image of a keyboard.

Additionally or alternatively, in training the augmented key generation model, the augmented key generation system 302 may train a computer vision model, and may train a mask recurrent neural network to detect bounding boxes of missing keys. For example, the augmented key generation model may be trained on an input set of images of keyboards with missing keys, where each image is labelled (e.g., using an annotation tool such as labelling to provide annotations of the area/bounding boxes of the missing key) with the location of a missing key. In these instances, the augmented key generation model may be trained to output a bounding box location based on an input image of a keyboard. In these instances, because the augmented key generation model may be trained to output a bounding box location rather than the missing key itself, the augmented key generation model may further be trained to perform optical character recognition on adjacent key locations (e.g., left, right, top, bottom, or the like). The augmented key generation model may further be trained to identify the missing key based on the adjacent keys identified during optical character recognition (e.g., if "W" is identified as the key to the left, the missing key is "E").

Additionally or alternatively, in training the augmented key generation model, the augmented key generation system 302 may train the augmented key generation model to process a keyboard image using optical character recognition to identified present keys. In these instances, the augmented key generation model may be trained to compare the identified presented keys to anticipated present keys. Accordingly, by comparing the identified presented keys to the anticipated present keys, the augmented key generation model may be trained to identify any missing keys.

Additionally or alternatively, in training the augmented key generation model, the augmented key generation system 302 may train the augmented key generation model to distinguish between key attributes. For example, the augmented key generation model may be trained to distinguish between color of missing and available keys. Additionally or alternatively, the augmented key generation model may be trained on key spacing. Additionally or alternatively, the augmented key generation model may be trained on adjacent keys (e.g., after key "W," it is expected that key "E" may be to its right, which may be to the left of key "R"). Additionally or alternatively, the augmented key generation model may be trained on keys in a particular row. For example, the augmented key generation model may be trained to identify that the space bar is in a bottom row of the keyboard, that the second to last row includes "Shift," "Z," "X," "C," "V," "B," "N," "M," and/or other key location information. For example, the augmented key generation model may be able to identify that if a missing key is in the second to last row and is the first key missing, it is the "Shift" key, or if it the second key it is the "Z," key. Accordingly, in these instances, the augmented key generation model may be trained on attributes such as color, spatial relationships of keys on a keyboard, and/or other information which may be used to identify the missing key, without needing to use optical character recognition. For example, the augmented key generation model may be trained to identify locations of squares, rectangles, and/or other shapes for various keyboard keys. In this example, the augmented key generation model may be trained to determine location coordinates for each of these squares, rectangles, and/or other shapes, and identify keyboard rows accordingly. In some instances, the augmented key generation model may be trained to apply one or more image processing techniques to identify key colors, and to subsequently analyze the identified colors to identify a missing key (e.g., missing key locations may have different color attributes as compared to a working key location/rectangle).

In some instances, the augmented key generation model may be trained to perform a spatial analysis to identify missing keys. For example, the augmented key generation model may be trained to detect rectangles using image processing. For example, the augmented key generation model may be trained with key widths, key spacing, horizontal (X) key coordinates, vertical (Y) key coordinates, or the like from various keyboards, which may, e.g., train the augmented key generation model to execute spatial analysis. For example, in training the augmented key generation model, the augmented key generation model may use the following constraints/parameters/algorithm: List of Missing Keys=empty; sort rectangles by their X location for a given row; Position=0; Process each rectangle where Abs(X−LeftX)<Key−Spacing, where LeftX is the left most X coordinate; If yes: LeftX=X+Key−Width+Key−Space, Position=Position+1, and move to the next rectangle to be processed in the row; If no: the key at the value of Position is a missing key—add missing key to List of Missing Keys, continue process for any other missing key; If all keys are processed in a row, move to next row; If all rows are processed, process stops.

Additionally or alternatively, the augmented key generation model may be trained to output augmented keys based on keyboard layout discrepancies. For example, the augmented key generation model may be trained with the list of hexadecimal codes representing different keyboard layouts. Accordingly, based on a preferred keyboard layout for a user, the augmented key generation model may be trained to identify a corresponding hexadecimal code, and identify any keys, not included on a current keyboard, that should be output as augmented keys (e.g., using machine learning, computer vision, and/or image processing). In some instances, the augmented key generation model may store user profiles based on the historical user typing information, which may train the augmented key generation model to identify preferred keyboard layouts for users. Furthermore, the augmented key generation model may be trained to distinguish between such preferred keyboard layouts and other keyboard layouts.

In some instances, the augmented key generation model may be trained to select a keyboard layout based on an application context (e.g., whether or not numbers are input into the application, or the like). Similarly, the augmented key generation model may be trained to select a keyboard layout based on a data or information entry field, and may, in these instances switch the keyboard layout for entry of information into different fields of the same application (e.g., number keys for a credit card field, letters/no numbers for a name field, both letter and numbers for an address field, or the like).

At step 403, the second user device 304 may capture a first keyboard image. For example, the second user device 304 may capture an image of a keyboard of the first user device 303.

At step 404, the second user device 304 may send the first keyboard image to the augmented key generation system 302. For example, the second user device 304 may send the first keyboard image to the augmented key generation system 302 via the communication interface 313 and while a wired or wireless connection is established between the augmented key generation system 302 and the second user device 304.

At step 405, the augmented key generation system 302 may identify one or more missing keys at the first user device 303. For example, the augmented key generation system 302 may feed the first keyboard image into the augmented key generation system 302, which may, e.g., use one or more machine learning/computer vision techniques to compare the first keyboard image the historical keyboard images to identify the one or more missing keys. For example, the augmented key generation system 302 may identify discrepancies between the first keyboard image and historical keyboard images of keyboards with the same layout as the keyboard of the first user device 303. In these instances, once a discrepancy (e.g., a missing key) is identified, the augmented key generation system 302 may compare the portion of the first keyboard image that includes the discrepancy to the same portion of the historical keyboard images, which may, e.g., enable the augmented key generation system 302 to identify the specific letter, number, character, and/or other function corresponding to the identified missing key.

At step 406, once the missing key has been identified, the augmented key generation system 302 may generate a first augmented key corresponding to the first missing key. For example, the augmented key generation system 302 may generate a software element, configured for display at the second user device 304 (e.g., within an augmented key application, or otherwise), that corresponds to the first missing key. For example, the first augmented key may be configured for visual display at the second user device 304, and may visually resemble the first missing key. Furthermore, the first augmented key may be configured to execute a function, corresponding to the function of the first missing key, at the first user device 303 once selected at the second user device 304.

At step 407, the augmented key generation system 302 may send the first augmented key to the second user device 304 for display. In some instances, the augmented key generation system 302 may also send one or more commands directing the second user device 304 to display the first augmented key. In some instances, the augmented key generation system 302 may automatically cause the second user device 304 to display the first augmented key without receiving further user input. Alternatively, the augmented key generation system 302 may send a notification of the first augmented key to the second user device 304, which may prompt the user to provide consent for the display and/or otherwise provide feedback on the generation of the first augmented key.

In some instances, the augmented key generation system 302 may also send a notification to the second user device 304 indicating a recommended placement for the second user device 304 with respect to the keyboard of the first user device 303 (e.g., a side of the keyboard on which to place the second user device 304, how far up or down the keyboard the second user device 304 should be placed, alignment information for the second user device 304 with regard to the first user device 303, and/or other information). For example, the augmented key generation system 302 may identify, based on the layout of the keyboard of the first user device 303, the most convenient location for the augmented key (e.g., where the augmented key may be placed in closest proximity to the broken key). For example, if the broken key is on the right side of the keyboard, the second user device 304 should be placed on the right side of the keyboard. Similarly, a position on the screen of the second user device 304 that is closest in proximity may also be determined. In some instances, the augmented key generation system 302 may communicate with the second user device 304 via the communication interface 313 and while a wired or wireless connection is established between the augmented key generation system 302 and the second user device 304.

Although generation of a single augmented key is described (e.g., the first augmented key), any number of augmented keys may be generated without departing from the scope of the disclosure (e.g., each corresponding to a different missing key). In some instances, one or more of the augmented keys may be sent to a single user device (e.g., second user device 304). Additionally or alternatively, one or more of the augmented keys may be sent to multiple devices (e.g., both the second user device 304 and the third user device 305, as illustrated in FIG. 4A). In these instances, the second user device 304 and the third user device 305 may be of different device types or the same device type. In some instances, where the first user device

303 is configured with a touch input screen, the augmented key generation system 302 may send the augmented key(s) to the first user device 303 itself for display on the touch input screen.

At step 408, the second user device 304 and/or third user device 305 may display the augmented keys (e.g., first augmented key and/or other augmented keys). For example, the second user device 304 (and/or third user device 305) may display a graphical user interface similar to the graphical user interface displayed on the second user device 304 in FIG. 8A. For example, the second user device 304 may display a graphical user interface that includes a selectable element corresponding to the first missing key. In some instances, the second user device 304 may also display a device position element, such as the line shown in FIG. 8A, which may indicate, on the display of the second user device 304, where the second user device 304 should be placed in relation to the keyboard of the first user device 303. In some instances, where augmented keys are displayed at both the second user device 304 and the third user device 305, the second user device 304 and the third user device 305 may be placed on opposite sides of the keyboard of the first user device 303.

In these instances, selection of the first augmented key may cause an output to be displayed (e.g., number, letter, and/or other character) and/or function to be executed at the first user device 303. In some instances, the first augmented key may be selected simultaneously with one or more physical keys of the keyboard of the first user device 303, which may, e.g., produce a result at the first user device 303 (e.g., selection of "shift" on the physical keyboard and augmented key "e" on the second user device 304 may produce a capital "E" on the display of the first user device 303).

In some instances, the augmented key generation system 302 may continuously monitor a location of the second user device 304, and may, based on detected a change in the location of the second user device 304, automatically adjust (e.g., by communicating with or otherwise directing the second user device 304) the location of the first augmented key on the second user device 304 to maintain a minimum proximity between the first augmented key and the missing key of the first user device 303.

Referring to FIG. 4B, at step 409, the first user device 303 and/or the augmented key generation system 302 may detect a defective key (which may, e.g., be a second key, different that the first key identified as missing above). For example, in addition or as an alternative to identifying the missing key and generating an augmented key accordingly as described above with regard to steps 403-408, the first user device 303 may detect a key that does not physically appear to be broken, but that is non-functional. In some instances, to detect the broken key, the first user device 303 may identify that the user has invoked an OSK and is selecting a particular key on the OSK rather than the keyboard of the first user device 303. Additionally or alternatively, the first user device 303 may detect the use of autocorrect to input a particular character (e.g., typing a word without a particular letter, and using autocorrect to insert the letter).

At step 410, the first user device 303 may send defective key information, indicating that the second key is broken, to the augmented key generation system 302. For example, the augmented key generation system 302 may continuously monitor the first user device 303 to detect such defective key information. Additionally or alternatively, the augmented key generation system 302 may monitor the first user device

303 to detect invocation of the OSK, use of autocorrect, and/or otherwise identify a broken key.

At step 411, the augmented key generation system 302 may identify, based on the defective key information, which key of the keyboard of the first user device 303 is defective. For example, the augmented key generation system 302 may ingest or otherwise read the defective key information to make this identification.

At step 412, once the defective key has been identified, the augmented key generation system 302 may generate a second augmented key corresponding to the defective key. For example, the augmented key generation system 302 may generate a software element, configured for display at the second user device 304 (e.g., within an augmented key application, or otherwise), that corresponds to the first missing key. For example, the second augmented key may be configured for visual display at the second user device 304, and may visually resemble the defective key. Furthermore, the second augmented key may be configured to execute a function, corresponding to the function of the defective key, at the first user device 303 once selected at the second user device 304. For example, actions performed at step 412 may be similar to those described above at step 406.

At step 413, the augmented key generation system 302 may send the second augmented key to the second user device 304 for display. In some instances, the augmented key generation system 302 may also send one or more commands directing the second user device 304 to display the second augmented key. In some instances, the augmented key generation system 302 may automatically cause second user device 304 to display the second augmented key without receiving further user input. Alternatively, the augmented key generation system 302 may send a notification of the second augmented key to the second user device 304, which may prompt the user to provide consent for the display and/or otherwise provide feedback on the generation of the augmented keyboard overlay.

In some instances, the augmented key generation system 302 may also send a notification to the second user device 304 indicating a recommended placement for the second user device 304 with respect to the keyboard of the first user device 303 (e.g., a side of the keyboard on which to place the second user device 304, how far up or down the keyboard the second user device 304 should be placed, alignment information for the second user device 304 with regard to the first user device 303, and/or other information). For example, the augmented key generation system 302 may identify, based on the layout of the keyboard of the first user device 303, the most convenient location for the second augmented key (e.g., where the second augmented key may be placed in closest proximity to the defective key). In some instances, in doing so, the augmented key generation system 302 may take into account locations of both the first missing key and the defective key when determining the recommended placement (e.g., a placement of the second user device 304 that minimizes total distance between both the first missing key and the first augmented key, and the defective key and the second augmented key). For example, if the defective key is on the right side of the keyboard, the second user device 304 should be placed on the right side of the keyboard. Similarly, a position on the screen of the second user device 304 that is closest in proximity may also be determined. In some instances, the augmented key generation system 302 may communicate with the second user device 304 via the communication interface 313 and while a wired or wireless connection is established between the augmented key generation system 302 and the second user device 304.

Although generation of a single augmented key is described (e.g., the second augmented key), any number of augmented keys may be generated without departing from the scope of the disclosure (e.g., each corresponding to a different defective key). In some instances, one or more of the augmented keys may be sent to a single user device (e.g., second user device 304). Additionally or alternatively, one or more of the augmented keys may be sent to multiple devices (e.g., both the second user device 304 and the third user device 305, as illustrated in FIG. 4A). In these instances, the second user device 304 and the third user device 305 may be of different device types or the same device type. In some instances, where the first user device 303 is configured with a touch input screen, the augmented key generation system 302 may send the augmented key(s) to the first user device 303 itself for display on the touch input screen. Actions performed at step 413 may, in some instances, be similar to those described above at step 407.

At step 414 the second user device 304 and/or third user device 305 may display the augmented keys (e.g., second augmented key and/or other augmented keys). For example, the second user device 304 (and/or third user device 305) may display a graphical user interface similar to the graphical user interface displayed on the second user device 304 in FIG. 8A. For example, the second user device 304 may display a graphical user interface that includes a selectable element corresponding to the first missing key. In these instances, selection of the second augmented key may cause an output to be displayed (e.g., letter, number, and/or other character) and/or function to be executed at the first user device 303.

In some instances, the second augmented key may be selected simultaneously with one or more physical keys of the keyboard of the first user device 303, which may, e.g., produce a result at the first user device 303 (e.g., selection of "shift" on the physical keyboard and augmented key "e" on the second user device 304 may produce a capital "E" on the display of the first user device 303).

Figure 8A:
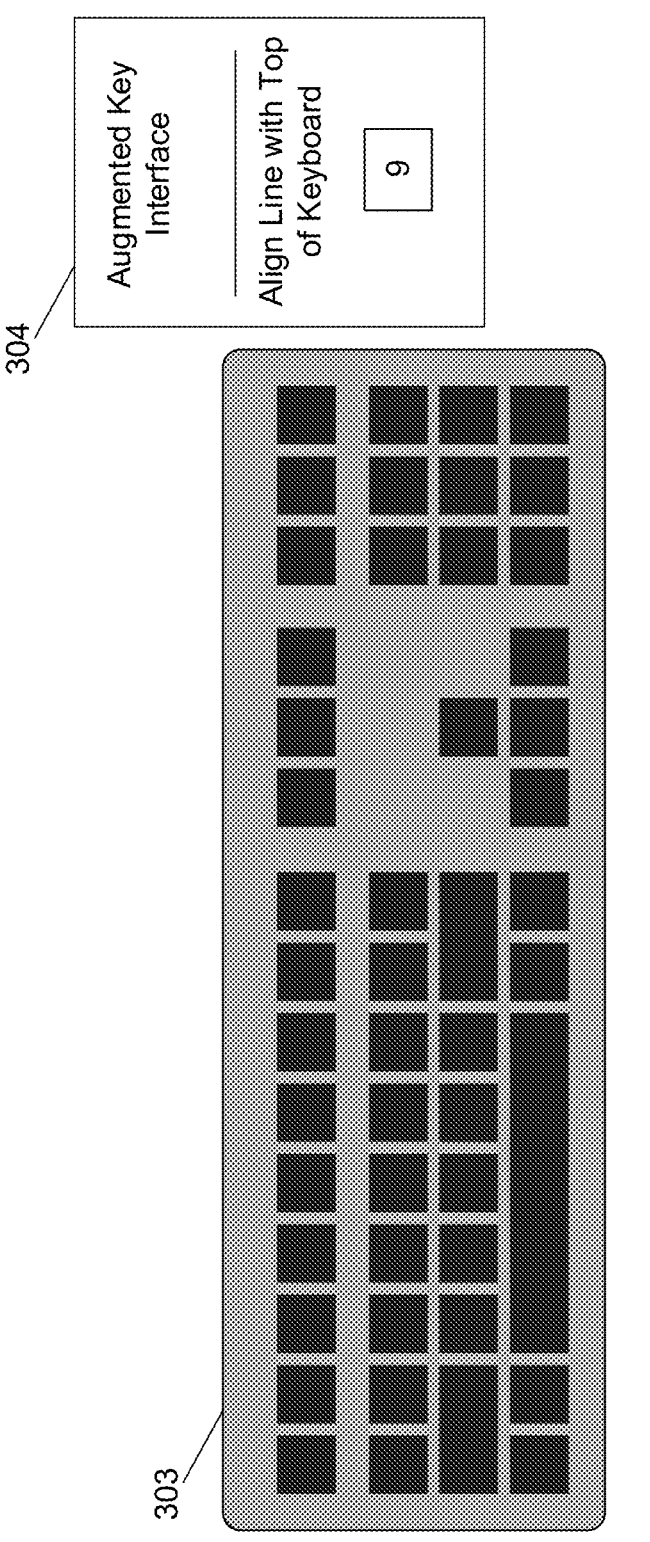
FIGS. 8A-8B depict illustrative computing components and interfaces for image and/or behavior based augmented key generation in accordance with one or more illustrative aspects described herein.

In some instances, the second user device 304 may also display a device position element, such as the line shown in FIG. 8A, which may indicate, on the display of the second user device 304, where the second user device 304 should be placed in relation to the keyboard of the first user device 303. In some instances, where augmented keys are displayed at both the second user device 304 and the third user device 305, the second user device 304 and the third user device 305 may be placed on opposite sides of the keyboard of the first user device 303.

In some instances, the augmented key generation system 302 may continuously monitor a location of the second user device 304, and may, based on detected a change in the location of the second user device 304, automatically adjust (e.g., by communicating with or otherwise directing the second user device 304) the location of the second augmented key on the second user device 304 to maintain a minimum proximity between the second augmented key and the missing key of the first user device 303 (e.g., moving the second augmented key closer to the broken key than it would be if it's position remained unchanged). Actions performed at step 414 may, in some instances, be similar to those described above with regard to step 408.

At step 415, the second user device 304 may capture another image of the keyboard of the first user device 303 (e.g., a second keyboard image). In some instances, actions performed at step 415 may be similar to those described above at step 403. For example, in addition or as an alternative to identifying the missing key/broken key and generating an augmented key accordingly as described above with regard to steps 403-408 and/or 409-414, respectively, the first user device 303 may detect that a sub-optimal keyboard is currently being used by the user (as described below).

At step 416, the second user device 304 may send the second keyboard image to the augmented key generation system 302. For example, the second user device 304 may send the second keyboard image to the augmented key generation system 302 via the communication interface 313 and while a wired or wireless connection is established between the augmented key generation system 302 and the second user device 304.

Referring to FIG. 4C, at step 417, the second user device 304 may send user information (e.g., identifying the user of the first user device 303, identifying a preferred keyboard for the user, or the like), to the augmented key generation system 302. Additionally or alternatively, this user information may be sent to the augmented key generation system 302 by a different user device corresponding to the user (e.g., first user device 303, third user device 305, and/or other devices).

At step 418, the augmented key generation system 302 may input the second keyboard image and/or the user information into the augmented key generation model to identify an augmented keyboard layout. For example, the augmented key generation system 302 may identify, using the augmented key generation model, a preferred keyboard layout for the user. For example, the augmented key generation system 302 may have previously trained the augmented key generation model based on user interaction information for the user indicating interactions of the user with various keyboards (e.g., at step 402), which may e.g., train the augmented key generation model to identify a most frequently used keyboard layout for the user. Then, once the user information is received, the augmented key generation system 302 may look up the corresponding user to identify the associated preferred keyboard.

Additionally, the augmented key generation system 302 may feed the second keyboard image into the augmented key generation model to identify a keyboard layout of the second image. For example, the augmented key generation model may compare the second keyboard image to other keyboard images, labelled with a corresponding keyboard format, and may identify the keyboard layout that matches the second keyboard image.

Once the keyboard layout of the second keyboard image and the preferred keyboard layout have been identified, the augmented key generation system 302 may use the augmented key generation model to compare these layouts. For example, the augmented key generation model may detect whether or not the preferred keyboard layout matches the keyboard layout of the second keyboard image. If these layouts do match, the event sequence may end. Otherwise, if the layouts do not match, the augmented key generation system 302 may generate an augmented keyboard overlay corresponding to the preferred keyboard layout, which may, e.g., be displayed as an augmented overlay on the keyboard of the first user device 303. For example, the augmented key generation system 302 may detect that the preferred layout corresponds to a first language, the keyboard of the first user device 303 corresponds to a second language. Additionally or alternatively, the augmented key generation system 302 may detect that the preferred layout includes a number pad, whereas the keyboard of the first user device 303 does not. Additionally or alternatively, the augmented key generation system 302 may detect that the preferred layout corresponds to a first manufacturer (and thus has specific keys to that manufacturer's layout) and the first user device 303 corresponds to a second manufacturer. For example, the preferred layout may include a print key, whereas the keyboard of the first user device 303 might not.

Additionally or alternatively, the augmented key generation system 302 may detect a difference in keyboard layout types of the preferred layout and the keyboard of the first user device 303 (e.g., layout type number 101, 102, 103, 106, or the like). For example, the keyboard layout structure for type 102 may include a backslash key, hash key, and/or other keys that might not be included in type 101 layouts. As another example, the keyboard layout structure for type 103 may include keys such as "Hanja," "Hungul mode," "Won," and/or other keys that are not included in type 101 layouts. Similarly, type 106 layouts may include keys such as "Yen," "Hash," "Ro," "NonConvert," "Convert," "KanaMode," and/or other keys that might not be included in type 101 layouts.

In some instances, in generating the augmented keyboard overlay, the augmented key generation system 302 may match the keys of the preferred keyboard layout to the existing keys of the keyboard of the first user device 303 (e.g., to improve the user experience).

At step 419, the augmented key generation system 302 may send the augmented keyboard overlay to the third user device 305. For example, the augmented key generation system 302 may send the augmented keyboard overlay to the third user device 305 via the communication interface 313 and while a wired or wireless connection is established between the augmented key generation system 302 and the third user device 305. In some instances, the augmented key generation system 302 may also send one or more commands directing the third user device 305 to display the augmented keyboard overlay. In some instances, the augmented key generation system 302 may automatically cause the third user device 305 to display the augmented keyboard overlay without receiving further user input. Alternatively, the augmented key generation system 302 may send a notification of the augmented keyboard overlay to the third user device 305, which may prompt the user to provide consent for the display and/or otherwise provide feedback on the generation of the augmented keyboard overlay. For example, the third user device 305 may, in some instances, be an augmented reality device such as AR glasses, or other augmented reality device, which may, e.g., be configured to display the augmented keyboard overlay on top of the keyboard of the first user device 303.

Figure 8B:
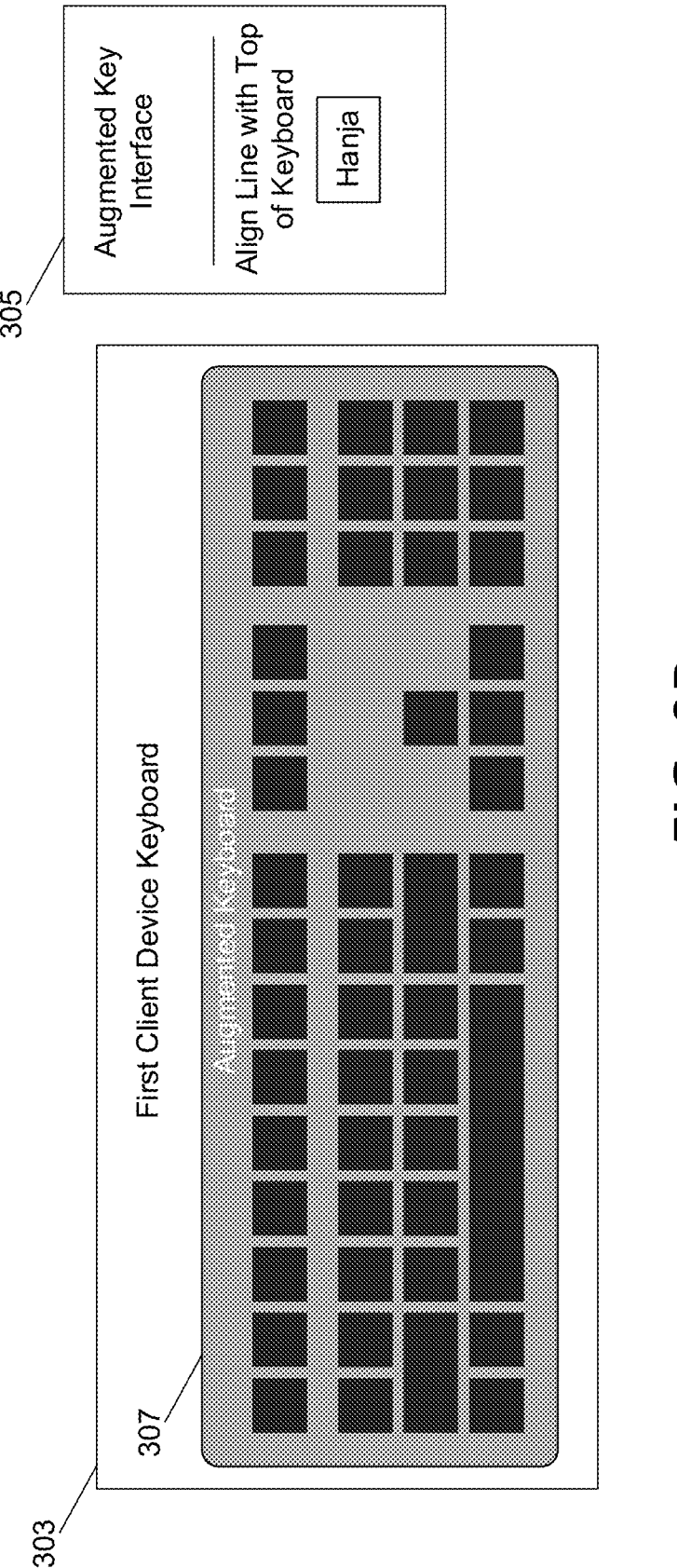

At step 420, based on or in response to the one or more commands directing the third user device 305 to display the augmented keyboard overlay, the third user device 305 may display the augmented keyboard overlay. For example, the third user device 305 may display the augmented keyboard overlay on top of the keyboard of the first user device 303, as illustrated by the augmented keyboard overlay 307, which is illustrated in FIG. 8B. For example, augmented keys of the augmented keyboard overlay may be fit to the existing keyboard layout of the first user device 303 (e.g., so that each augmented key of the overlay has a corresponding physical key of the first user device). In these instances, there may, in some instances, be remaining keys of the preferred keyboard that are not included in the augmented keyboard overlay (e.g., because they cannot be fit to the existing keyboard layout). In these instances, augmented keys may be generated for these remaining keys as described below. In these instances, selection of a key, included in the augmented keyboard overlay, may cause a corresponding output (e.g., letter, number, and/or other character) to be displayed and/or function to be executed at the first user device 303.

At step 421, the augmented key generation system 302 may compare the preferred keyboard layout to the augmented keyboard overlay to identify whether all keys of the preferred keyboard layout are included in the augmented keyboard overlay. For example, in some instances, due to the layout of the keyboard of the first user device 303, the augmented key generation system 302 may have generated an augmented keyboard overlay that did not include all keys of the preferred keyboard layout (e.g., the preferred keyboard layout may include more keys than the keyboard of the first user device 303, and the augmented key generation system 302 might not have been able to include all of these keys in the overlay). For example, the augmented key generation system 302 may identify that the preferred keyboard layout includes a key configured to perform a particular function, but the augmented keyboard overlay does not include a key configured to perform the particular function. In some instances, these differences in keyboard layout may be a result of a difference in languages used in the preferred keyboard layout and the keyboard of the first user device 303. For example, as described above, the augmented key generation system 302 may detect that the preferred layout includes a number pad, whereas the keyboard of the first user device 303 does not. Additionally or alternatively, the augmented key generation system 302 may detect that the preferred layout corresponds to a first manufacturer (and thus has specific keys to that manufacturer's layout) and the first user device 303 corresponds to a second manufacturer. For example, the preferred layout may include a print key, whereas the keyboard of the first user device 303 might not.

Additionally or alternatively, the augmented key generation system 302 may detect a difference in keyboard layout types of the preferred layout and the keyboard of the first user device 303 (e.g., layout type number 101, 102, 103, 106, or the like). For example, the keyboard layout structure for type 102 may include a backslash key, hash key, and/or other keys that might not be included in type 101 layouts. As another example, the keyboard layout structure for type 103 may include keys such as "Hanja," "Hungul mode," "Won," and/or other keys that are not included in type 101 layouts. Similarly, type 106 layouts may include keys such as "Yen," "Hash," "Ro," "NonConvert," "Convert," "KanaMode," and/or other keys that might not be included in type 101 layouts.

Additionally or alternatively, the user's preferred keyboard may be in a different language (which may, e.g., correspond to a 102 keyboard layout) than the keyboard of the first user device 303 (which may, e.g., be a 101 keyboard layout), and thus the keyboard of the first user device may be missing keys from the preferred layout.

In these instances, the augmented key generation system 302 may identify any missing keys (e.g., at least a second missing key), included in the preferred keyboard layout and not included in the augmented keyboard overlay. Otherwise, if no missing keys are identified, the event sequence may end.

At step 422, once the missing key has been identified, the augmented key generation system 302 may generate a third augmented key corresponding to the second missing key. For example, the augmented key generation system 302 may generate a software element, configured for display at the second user device 304 (e.g., within an augmented key application, or otherwise), that corresponds to the second missing key. For example, the third augmented key may be configured for visual display at the second user device 304, and may visually resemble the second missing key. Furthermore, the third augmented key may be configured to execute a function, corresponding to the function of the second missing key, at the first user device 303 once selected at the second user device 304. In some instances, actions performed at step 422 may be similar to those described above at steps 406 and/or 412.

At step 423, the augmented key generation system 302 may send the third augmented key to the second user device 304 for display. In some instances, the augmented key generation system 302 may also send one or more commands directing the second user device 304 to display the third augmented key. In some instances, the augmented key generation system 302 may automatically cause the second user device 304 to display the third augmented key without receiving further user input. Alternatively, the augmented key generation system 302 may send a notification of the third augmented key to the second user device 304, which may prompt the user to provide consent for the display and/or otherwise provide feedback on the generation of the third augmented key.

In some instances, the augmented key generation system 302 may also send a notification to the second user device 304 indicating a recommended placement for the second user device 304 with respect to the keyboard of the first user device 303 (e.g., a side of the keyboard on which to place the second user device 304, how far up or down the keyboard the second user device 304 should be placed, alignment information for the second user device 304 with regard to the first user device 303, and/or other information). For example, the augmented key generation system 302 may identify, based on the augmented keyboard overlay, the most convenient location for the third augmented key (e.g., where the third augmented key may be placed in closest proximity to the second missing key). For example, if the second missing key is on the right side of the keyboard, the second user device 304 should be placed on the right side of the keyboard. Similarly, a position on the screen of the second user device 304 that is closest in proximity may also be determined. In some instances, the augmented key generation system 302 may communicate with the second user device 304 via the communication interface 313 and while a wired or wireless connection is established between the augmented key generation system 302 and the second user device 304.

Although generation of a single augmented key is described (e.g., the third augmented key), any number of augmented keys may be generated without departing from the scope of the disclosure (e.g., each corresponding to a different missing key). In some instances, one or more of the augmented keys may be sent to a single user device (e.g., second user device 304). Additionally or alternatively, one or more of the augmented keys may be sent to multiple devices (e.g., as illustrated in FIG. 4A with regard to the second user device 304 and the third user device 305). In these instances, these different devices may be of different device types or the same device type. In some instances, where the first user device 303 is configured with a touch input screen, the augmented key generation system 302 may send the augmented key(s) to the first user device 303 itself for display on the touch input screen. In some instances, actions performed at step 423 may be similar to those described above with regard to steps 407 and/or 413.

At step 424, the second user device 304 and/or other user devices may display the augmented keys (e.g., third augmented key and/or other augmented keys). For example, the second user device 304 (and/or other user device) may display a graphical user interface similar to the graphical user interface displayed on the second user device 304 in FIG. 8B. For example, the second user device 304 may display a graphical user interface that includes a selectable element corresponding to the second missing key. In these instances, selection of the third augmented key may cause an output to be displayed (e.g., letter, number, and/or other character) and/or function to be executed at the first user device 303. In some instances, the second user device 304 may also display a device position element, such as the line shown in FIG. 8B, which may indicate, on the display of the second user device 304, where the second user device 304 should be placed in relation to the keyboard of the first user device 303/the augmented keyboard overlay.

In some instances, the third augmented key may be selected simultaneously with one or more keys of the augmented keyboard overlay, which may, e.g., produce a result at the first user device 303 (e.g., selection of "shift" on the augmented keyboard overlay and augmented key "e" on the second user device 304 may produce a capital "E" on the display of the first user device 303).

In some instances, where augmented keys are displayed at multiple user devices, these devices may be placed on opposite sides of the keyboard of the first user device 303. In some instances, the augmented key generation system 302 may continuously monitor a location of the second user device 304, and may, based on detected a change in the location of the second user device 304, automatically adjust (e.g., by communicating with or otherwise directing the second user device 304) the location of the third augmented key on the second user device 304 to maintain a minimum proximity between the third augmented key and the missing key of the first user device 303 (e.g., moving the third augmented key closer to the second missing key than it would be if it's position remained unchanged). In some instances, actions performed at step 424 may be similar to those described at steps 408 and/or 414 above.

At step 425, based on the missing keys, broken keys, augmented keys, and/or augmented keyboard overlays identified/determined in the methods described above, the augmented key generation system 302 may update or otherwise refine the augmented key generation model. For example, the augmented key generation model may include an iterative, dynamic, and/or otherwise continuous feedback loop, which may, e.g., continuously improve performance of the augmented key generation model in identifying broken or missing keys, and in outputting augmented keys and/or keyboard overlays accordingly.

Although steps 401-425 are shown as a single event sequence, the missing key (e.g., steps 403-408), broken key (e.g., steps 409-414), and/or not preferred keyboard layout (e.g., steps 415-424) use cases may, in some instances, be performed independently of each other, and/or in a different order than the illustrated sequence, without departing from the scope of the disclosure. Additionally, although the use cases of missing keys, broken keys, and/or preferred keyboard layouts are described above, any of the above described methods may be performed to adjust or otherwise compensate for changing keyboard layouts and/or other use cases without departing from the scope of the disclosure.

Figure 5:
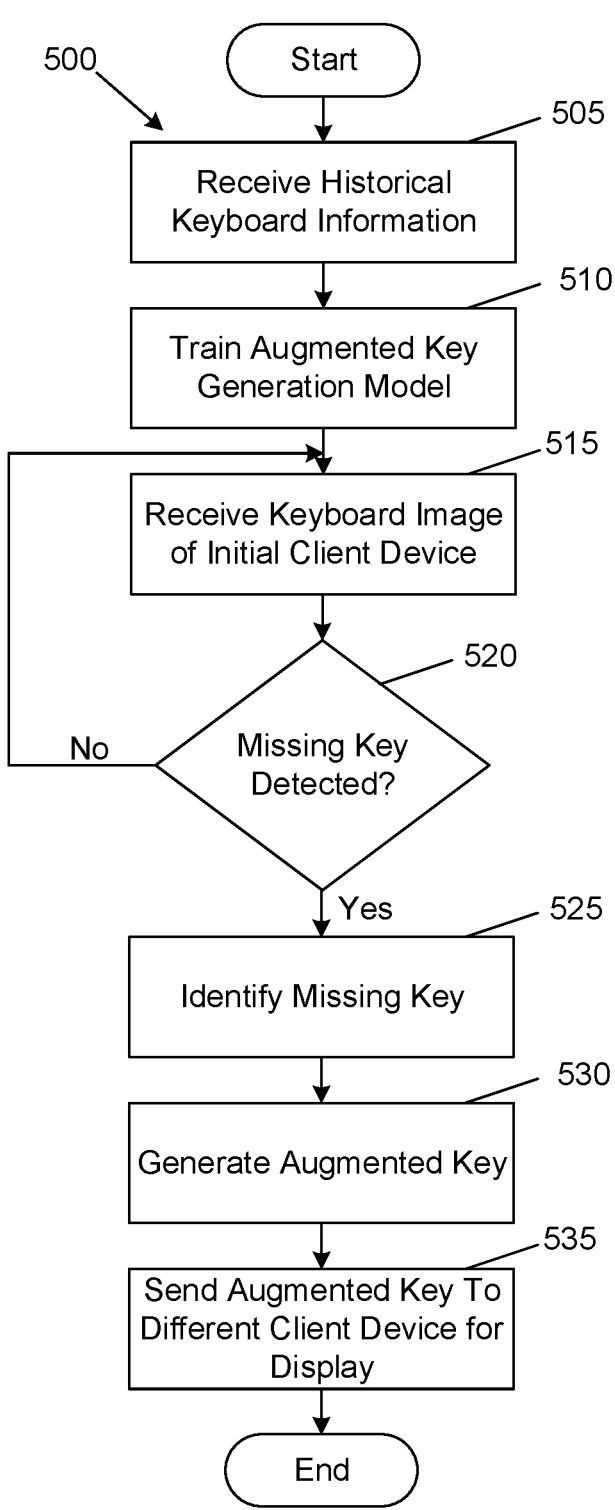
FIGS. 5-7 depict an illustrative methods that may be used for image and/or behavior based augmented key generation in accordance with one or more illustrative aspects described herein.

FIG. 5 depicts an illustrative method 500 for performing image and/or behavior based augmented key generation in accordance with one or more example embodiments. For example, at step 505, a computing platform may receive historical keyboard information. At step 510, the computing platform may train an augmented key generation model using the historical keyboard information. At step 515, the computing platform may receive a keyboard image of an initial client device. At step 520, the computing platform may detect whether or not a key is missing from the initial client device. If no missing key is detected, the computing platform may return to step 515. If a missing key is detected, the computing platform may proceed to step 525.

At step 525, the computing platform may identify the missing key. At step 530, the computing platform may generate an augmented key corresponding to the missing key. At step 535, the computing platform may send the augmented key to a different client device for display.

Figure 6:
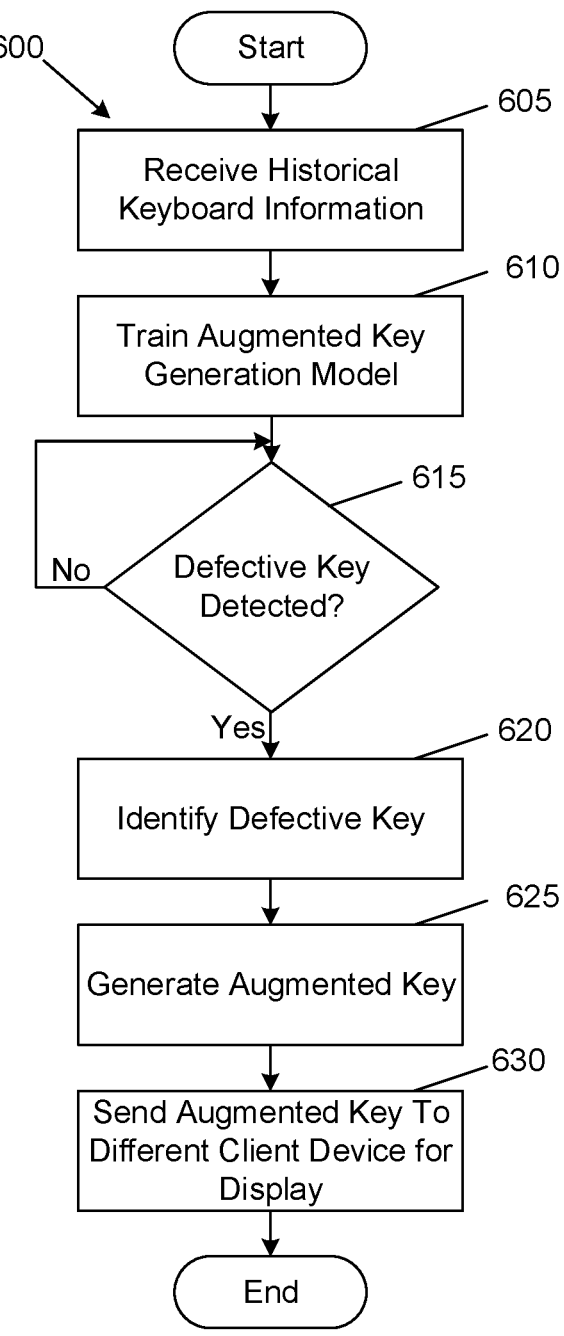

FIG. 6 depicts an illustrative method 600 for performing image and/or behavior based augmented key generation in accordance with one or more example embodiments. For example, at step 605, a computing platform may receive historical keyboard information. At step 610, the computing platform may train an augmented key generation model using the historical keyboard information. At step 615, the computing platform may identify whether a keyboard includes a defective key. If a defective key is not detected, the computing platform may return to step 615. If a defective key is detected, the computing platform may proceed to step 620.

At step 620, the computing platform may identify the defective key. At step 625, the computing platform may generate an augmented key corresponding to the defective key. At step 630, the computing platform may send the augmented key to a different client device for display.

Figure 7:
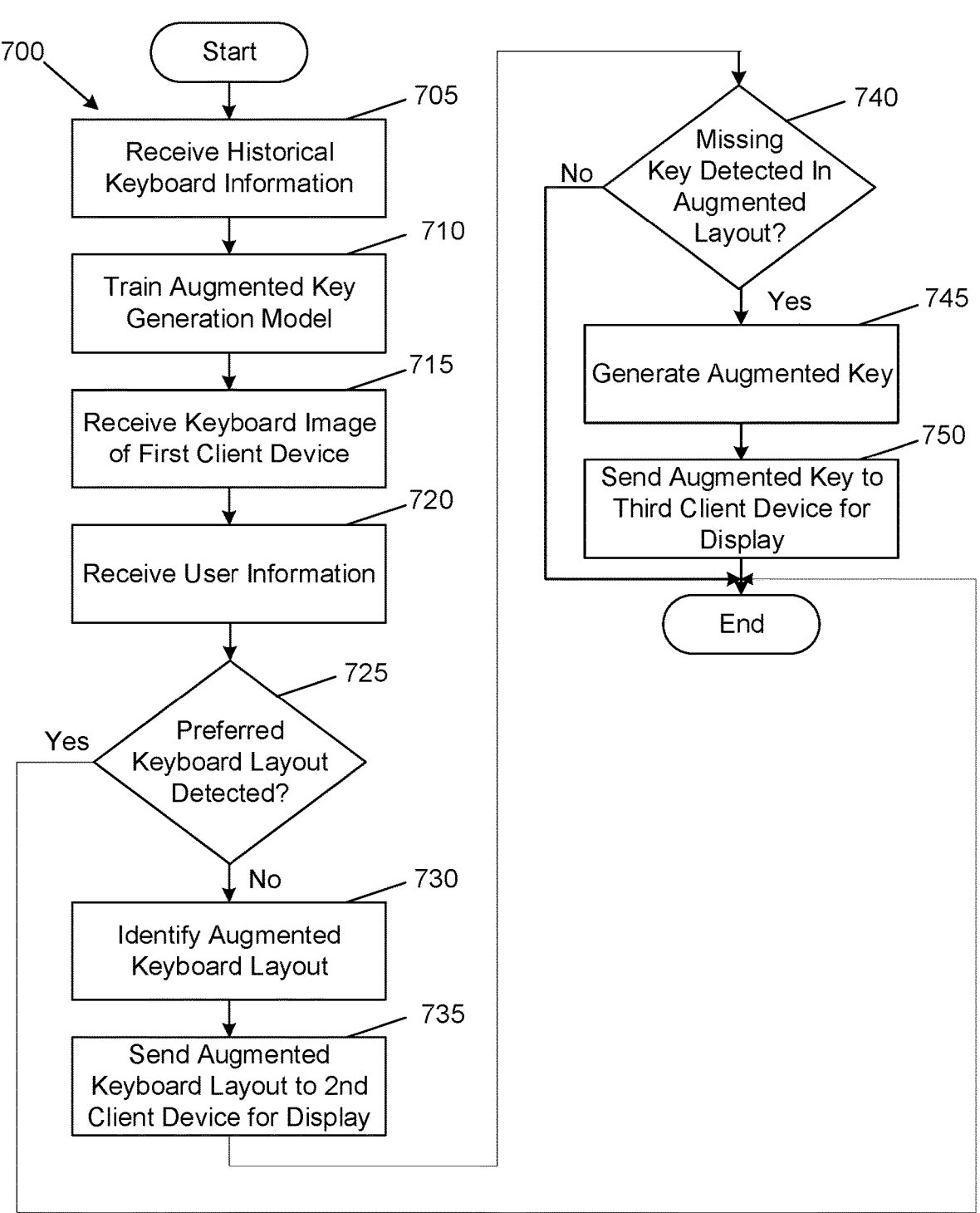

FIG. 7 depicts an illustrative method 700 for performing image and/or behavior based augmented key generation in accordance with one or more example embodiments. For example, at step 705, a computing platform may receive historical keyboard information. At step 710, the computing platform may train an augmented key generation model using the historical keyboard information. At step 715, the computing platform may receive a keyboard image of a first client device. At step 720, the computing platform may receive user information identifying a user of the first client device. At step 725, the computing platform may determine whether a keyboard layout of the first client device matches a preferred layout for the user. If the keyboard layouts do match, the method may end. Otherwise, if the keyboard layouts do not match, the computing platform may proceed to step 730.

At step 730, the computing platform may generate an augmented keyboard layout corresponding to the preferred layout. At step 735, the computing platform may send the augmented layout to a second computing device for display (e.g., as an overlay on the first client device). At step 740, the computing platform may determine whether the augmented layout is missing any keys of the preferred layout. If no keys are missing, the method may end. Otherwise, if keys are missing, the computing platform may proceed to step 745.

At step 745, the computing platform may generate an augmented key corresponding to the missing key. At step 750, the computing platform may send the augmented key to a third client device for display.

The following paragraphs (M1) through (M15) describe examples of methods that may be implemented in accordance with the present disclosure.

(M1) A method comprising: receiving, from a first user device, an image of a keyboard of a second user device; detecting, based on the image, a first missing key of the keyboard of the second user device; determining an identity of the first missing key; generating an augmented version of the first missing key; and sending, to the first user device, the augmented version of the first missing key and one or more commands directing the first user device to display the augmented version of the first missing key, wherein: sending the one or more commands directing the first user device to display the augmented version of the first missing key causes the first user device to display the augmented version of the first missing key, and selection of the augmented version of the first missing key on the first user device causes display of a character, corresponding to the first missing key, to be displayed at the second user device.

(M2) A method may be performed as described in paragraph (M1) wherein the first user device comprises one of: a mobile device, a tablet, or augmented reality glasses, and wherein the second user device comprises one of: a desktop computer or a laptop computer.

(M3) A method may be performed as described in any of paragraphs (M1) through (M2), wherein determining the identity of the first missing key comprises identifying, using machine learning computer vision image processing, the first missing key.

(M4) A method may be performed as described in any of paragraphs (M1) through (M3) further comprising: identifying, based on a position of the first missing key on the keyboard of the second user device, a placement recommendation for the first user device, wherein the placement recommendation for the first user device indicates: a side of the keyboard of the second user device on which to place the first user device, and a position, on the indicated side, with respect to the keyboard of the second user device at which to place the first user device; and sending, to the first user device and along with the augmented version of the first missing key, the placement recommendation.

(M5) A method may be performed as described in any of paragraphs (M1) through (M4), further comprising: identifying a location of the first user device with respect to the keyboard of the second user device, wherein sending the one or more commands directing the first user device to display the augmented version of the first missing key causes the first user device to display the augmented version of the first missing key at a position of the first user device that is most proximate to a location of the first missing key on the keyboard of the second user device.

(M6) A method may be performed as described in paragraph (M5), further comprising: detecting a change in the location of the first user device with respect to the keyboard of the second user device; and sending, based on detecting the change in the location of the first user device, one or more commands directing the first user device to display the augmented version of the first missing key at a different position on the first user device, wherein the different position is more proximate to the location of the first missing key on the keyboard of the second user device than the position after the change in the location of the first user device.

(M7) A method may be performed as described in any of paragraphs (M1) through (M6), wherein simultaneous selection of the first missing key and a second key on the keyboard of the second user device has an expected function, and wherein simultaneous selection of the augmented version of the first missing key and the second key on the keyboard of the second user device executes the expected function.

(M8) A method may be performed as described in any of paragraphs (M1) through (M7) further comprising: monitoring the second user device; and detecting, while monitoring the second user device, that a second key of the keyboard of the second user device: is physically present on the keyboard of the second user device, and selection of the second key fails to cause a second character, corresponding to the second key, to be displayed at the second user device.

(M9) A method may be performed as described in paragraph (M8), wherein detecting that the second key fails to cause the second character to be displayed at the second user device comprising detecting one or more of: selection of the second character on an on screen keyboard (OS K) at the second user device; or use of autocorrection at the second user device to insert the second character into a plurality of words.

(M10) A method may be performed as described in any of paragraphs (M1)-(M9), further comprising: receiving user preference information, wherein the user preference information indicates a preferred keyboard for a user of the second user device; and identifying, by comparing the preferred keyboard to the keyboard of the second user device, that the keyboard of the second user device is different that the preferred keyboard.

(M11) A method may be performed as described in paragraphs (M10), further comprising: identifying keys, included in the preferred keyboard, that are not included in the keyboard of the second user device; generating an augmented version of the identified keys; and sending, to the first user device, the augmented version of the identified keys and one or more commands directing the first user device to display the augmented version of the identified keys, wherein: sending the one or more commands directing the first user device to display the augmented version of the identified keys causes the first user device to display the augmented version of the identified keys, and selection of the augmented version of one or more of the identified keys causes display of a character, of the corresponding identified key, to be displayed at the second user device.

(M12) A method may be performed as described in paragraph (M10), wherein the preferred keyboard includes a second key configured to perform a particular function, and wherein the keyboard of the second user device does not includes a key configured to perform the particular function.

(M13) A method may be performed as described in paragraph (M12), further comprising: generating an augmented version of the second key; and sending, to the first user device, the augmented version of the second key and one or more commands directing the first user device to display the augmented version of the second key, wherein: sending the one or more commands directing the first user device to display the augmented version of the second key causes the first user device to display the augmented version of the second key, and selection of the augmented version of second key causes execution of the particular function at the second user device.

(M14) A method may be performed as described in paragraph (M10), wherein: the preferred keyboard corresponds to a first language, the keyboard of the second user device corresponds to a second language, and a layout of the preferred keyboard is different that a layout of the keyboard of the second user device.

(M15) A method may be performed as described in paragraph (M14), further comprising: generating an augmented version of the preferred keyboard, wherein the augmented version of the preferred keyboard is: configured for display as an overlay on top of the keyboard of the second user device, and based on the layout of the keyboard of the second user device; identifying one or more keys, included in the preferred keyboard and not included in the keyboard of the second user device; generating an augmented version of the identified one or more keys; sending, to a third user device, the augmented version of the preferred keyboard and one or more commands directing the third user device to display the augmented version of the preferred keyboard as an augmented reality overlay on the keyboard of the second user device, wherein the third user device comprises an augmented reality device; and sending, to the first user device, the augmented version of the identified one or more keys, and one or more commands directing the first user device to display the augmented version of the identified keys.

The following paragraphs (A1) through (A4) describe examples of apparatuses that may be implemented in accordance with the present disclosure.

(A1) An apparatus comprising a processor; memory storing computer executable instructions that, when executed by the processor, cause the apparatus to: receive, from a first user device, an image of a keyboard of a second user device; detect, based on the image, a first missing key of the keyboard of the second user device; determine an identity of the first missing key; generate an augmented version of the first missing key; and send, to the first user device, the augmented version of the first missing key and one or more commands directing the first user device to display the augmented version of the first missing key, wherein: sending the one or more commands directing the first user device to display the augmented version of the first missing key causes the first user device to display the augmented version of the first missing key, and selection of the augmented version of the first missing key on the first user device causes display of a character, corresponding to the first missing key, to be displayed at the second user device.

(A2) An apparatus as described in paragraph (A1), wherein the first user device comprises one of: a mobile device, a tablet, or augmented reality glasses, and wherein the second user device comprises one of: a desktop computer or a laptop computer.

(A3) An apparatus as described in any one of paragraphs (A1)-(A2), wherein determining the identity of the first missing key comprises identifying, using machine learning computer vision image processing, the first missing key.

(A4) An apparatus as described in any one of paragraphs (A1)-(A3), wherein the computer executable instructions, when executed by the processor, further cause the apparatus to: identify, based on a position of the first missing key on the keyboard of the second user device, a placement recommendation for the first user device, wherein the placement recommendation for the first user device indicates a side of the keyboard of the second user device on which to place the first user device and a position, on the indicated side, with respect to the keyboard of the second user device at which to place the first user device; and send, to the first user device and along with the augmented version of the first missing key, the placement recommendation.

The following paragraph (CRM1) describes examples of computer-readable media that may be implemented in accordance with the present disclosure.

(CRM1) A non-transitory computer-readable medium storing instructions that, when executed, cause a system to: receive, from a first user device, an image of a keyboard of a second user device; detect, based on the image, a first missing key of the keyboard of the second user device; determine an identity of the first missing key; generate an augmented version of the first missing key; and send, to the first user device, the augmented version of the first missing key and one or more commands directing the first user device to display the augmented version of the first missing key, wherein: sending the one or more commands directing the first user device to display the augmented version of the first missing key causes the first user device to display the augmented version of the first missing key, and selection of the augmented version of the first missing key on the first user device causes display of a character, corresponding to the first missing key, to be displayed at the second user device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, from a first user device, an image of a keyboard of a second user device, wherein the first user device is a touch screen device;
detecting, based on the image, a first missing key of the keyboard of the second user device;
determining an identity of the first missing key;
generating an augmented version of the first missing key;
identifying, based on a position of the first missing key on the keyboard of the second user device, a placement recommendation for the first user device, wherein the placement recommendation for the first user device indicates:
a side of the keyboard of the second user device on which to place the first user device, and
a position, on the indicated side, with respect to the keyboard of the second user device at which to place the first user device; and
sending, to the first user device, the augmented version of the first missing key and one or more commands directing the first user device to display the augmented version of the first missing key, wherein:
sending the one or more commands directing the first user device to display the augmented version of the first missing key causes the first user device to display the augmented version of the first missing key, and
selection of the augmented version of the first missing key on the first user device causes display of a character, corresponding to the first missing key, to be displayed at the second user device; and sending, to the first user device and along with the augmented version of the first missing key, the placement recommendation.

2. The method of claim 1, wherein the second user device comprises one of: a desktop computer or a laptop computer.

3. The method of claim 1, wherein determining the identity of the first missing key comprises identifying, using machine learning computer vision image processing, the first missing key.

4. The method of claim 1, further comprising:

identifying a location of the first user device with respect to the keyboard of the second user device, wherein sending one or more commands to the first user device causes the first user device to display the augmented version of the first missing key at a different position on the first user device that is in a closest possible proximity to the location of the first missing key on the keyboard based on an intended location of the first user device.

5. The method of claim 4, further comprising:

detecting a change in the location of the first user device with respect to the keyboard of the second user device; and sending, based on detecting the change in the location of the first user device, one or more commands directing the first user device to display the augmented version of the first missing key at a different position on the first user device, wherein the different position is based on the location of the first missing key on the keyboard of the second user device than the position after the change in the location of the first user device.

6. The method of claim 1, wherein simultaneous selection of the first missing key and a second key on the keyboard of the second user device has an expected function, and wherein simultaneous selection of the augmented version of the first missing key and the second key on the keyboard of the second user device executes the expected function.

7. The method of claim 1 further comprising:

monitoring the second user device; and detecting, while monitoring the second user device, that a second key of the keyboard of the second user device:

is physically present on the keyboard of the second user device, and selection of the second key fails to cause a second character, corresponding to the second key, to be displayed at the second user device.

8. The method of claim 7, wherein detecting that the second key fails to cause the second character to be displayed at the second user device comprising detecting one or more of:

selection of the second character on an on screen keyboard (OSK) at the second user device; or use of autocorrection at the second user device to insert the second character into a plurality of words.

9. The method of claim 1, further comprising:

receiving user preference information, wherein the user preference information indicates a preferred keyboard for a user of the second user device; and identifying, by comparing the preferred keyboard to the keyboard of the second user device, that the keyboard of the second user device is different that the preferred keyboard.

10. The method of claim 9, further comprising:

identifying keys, included in the preferred keyboard, that are not included in the keyboard of the second user device;

generating an augmented version of the identified keys; and sending, to the first user device, the augmented version of the identified keys and one or more commands directing the first user device to display the augmented version of the identified keys, wherein:

sending the one or more commands directing the first user device to display the augmented version of the identified keys causes the first user device to display the augmented version of the identified keys, and selection of the augmented version of one or more of the identified keys causes display of a character, of the corresponding identified key, to be displayed at the second user device.

11. The method of claim 9, wherein the preferred keyboard includes a second key configured to perform a particular function, and wherein the keyboard of the second user device does not includes a key configured to perform the particular function.

12. The method of claim 11, further comprising:

generating an augmented version of the second key; and sending, to the first user device, the augmented version of the second key and one or more commands directing the first user device to display the augmented version of the second key, wherein:

sending the one or more commands directing the first user device to display the augmented version of the second key causes the first user device to display the augmented version of the second key, and selection of the augmented version of second key causes execution of the particular function at the second user device.

13. The method of claim 9, wherein:

the preferred keyboard corresponds to a first language, the keyboard of the second user device corresponds to a second language, and a layout of the preferred keyboard is different than a layout of the keyboard of the second user device.

14. The method of claim 13, further comprising:

generating an augmented version of the preferred keyboard, wherein the augmented version of the preferred keyboard is:

configured for display as an overlay on top of the keyboard of the second user device, and based on the layout of the keyboard of the second user device;

identifying one or more keys, included in the preferred keyboard and not included in the keyboard of the second user device;

generating an augmented version of the identified one or more keys;

sending, to a third user device, the augmented version of the preferred keyboard and one or more commands directing the third user device to display the augmented version of the preferred keyboard as an augmented reality overlay on the keyboard of the second user device, wherein the third user device comprises an augmented reality device; and sending, to the first user device, the augmented version of the identified one or more keys, and one or more commands directing the first user device to display the augmented version of the identified keys.

15. A computing system comprising:

a processor;

memory storing computer executable instructions that, when executed by the processor, cause the computing system to:

receive, from a first user device, an image of a keyboard of a second user device, wherein the first user device is a touchscreen device;

detect, based on the image, a first missing key of the keyboard of the second user device;

determine an identity of the first missing key;

generate an augmented version of the first missing key;

send, to the first user device, the augmented version of the first missing key and one or more commands directing the first user device to display the augmented version of the first missing key, wherein:

sending the one or more commands directing the first user device to display the augmented version of the first missing key causes the first user device to display the augmented version of the first missing key, and selection of the augmented version of the first missing key on the first user device causes display of a character, corresponding to the first missing key, to be displayed at the second user device; and identify, based on a position of the first missing key on the keyboard of the second user device, a placement recommendation for the first user device, wherein the placement recommendation for the first user device indicates a side of the keyboard of the second user device on which to place the first user device and a position, on the indicated side, with respect to the keyboard of the second user device at which to place the first user device; and send, to the first user device and along with the augmented version of the first missing key, the placement recommendation.

16. The computing system of claim 15, wherein the second user device comprises one of: a desktop computer or a laptop computer.

17. The computing system of claim 15, wherein determining the identity of the first missing key comprises identifying, using machine learning computer vision image processing, the first missing key.

18. One or more non-transitory computer-readable media storing instructions that, when executed by a computing system comprising at least one processor, a communication interface, and memory, cause the computing system to:

receive, from a first user device, an image of a keyboard of a second user device, wherein the first user device is a touchscreen device;

detect, based on the image, a first missing key of the keyboard of the second user device;

determine an identity of the first missing key;

generate an augmented version of the first missing key; and send, to the first user device, the augmented version of the first missing key and one or more commands directing the first user device to display the augmented version of the first missing key, wherein:

sending the one or more commands directing the first user device to display the augmented version of the first missing key causes the first user device to display the augmented version of the first missing key, and selection of the augmented version of the first missing key on the first user device causes display of a character, corresponding to the first missing key, to be displayed at the second user device; and identify, based on a position of the first missing key on the keyboard of the second user device, a placement recommendation for the first user device, wherein the placement recommendation for the first user device indicates a side of the keyboard of the second user device on which to place the first user device and a position, on the indicated side, with respect to the keyboard of the second user device at which to place the first user device; and send, to the first user device and along with the augmented version of the first missing key, the placement recommendation.

* * * * *